United States Patent
Nakanoya

(10) Patent No.: US 10,983,802 B2
(45) Date of Patent: Apr. 20, 2021

(54) RELATION AMONG STATES APPENDING DEVICE, RELATION AMONG STATES APPENDING METHOD, AND RELATION AMONG STATES APPENDING PROGRAM

(71) Applicant: NEC Corporation, Tokyo (JP)

(72) Inventor: Manabu Nakanoya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 16/344,411

(22) PCT Filed: Oct. 5, 2017

(86) PCT No.: PCT/JP2017/036363
§ 371 (c)(1),
(2) Date: Apr. 24, 2019

(87) PCT Pub. No.: WO2018/079224
PCT Pub. Date: May 3, 2018

(65) Prior Publication Data
US 2019/0265980 A1    Aug. 29, 2019

(30) Foreign Application Priority Data
Oct. 26, 2016    (JP) .............................. JP2016-209490

(51) Int. Cl.
*G06F 9/00* (2006.01)
*G06F 9/24* (2006.01)
(Continued)

(52) U.S. Cl.
CPC .......... *G06F 9/445* (2013.01); *G06F 9/45558* (2013.01)

(58) Field of Classification Search
CPC .. G06F 9/445; G06F 9/44505; G06F 9/45558; G06F 8/30
See application file for complete search history.

(56) References Cited

U.S. PATENT DOCUMENTS

2008/0172553 A1* 7/2008 Childress .............. G06F 9/4405
713/2
2018/0357085 A1* 12/2018 Yan ...................... G06F 9/45537

FOREIGN PATENT DOCUMENTS

JP        5229223 B2    7/2013
JP      2015215885 A    12/2015
(Continued)

OTHER PUBLICATIONS

"An Overview of Chef", [online], Chef Documents, Retrieved Oct. 12, 2016, pp. 1-6, https://docs.chef.io/platform_overview.html.
(Continued)

*Primary Examiner* — Nitin C Patel

(57) ABSTRACT

A change procedure generating device 10 includes: a storage means 11 which stores, for each relation among constituent elements of a system, a plurality of instances of inter-state information which indicates relations among states of the constituent elements wherein a follow-up state limitation is included which represents a relation between a state transition of the constituent elements of the system and prescribed states to which the constituent elements transition after the state transition has been executed, and an appending means 12 which appends the relations among the states of the constituent elements to an inputted system configuration definition, using the inter-state information which corresponds to the relations among the constituent elements which are included in the configuration definition.

20 Claims, 10 Drawing Sheets

(51) Int. Cl.
*G06F 15/177* (2006.01)
*G06F 9/445* (2018.01)
*G06F 9/455* (2018.01)

(56) References Cited

FOREIGN PATENT DOCUMENTS

JP 2015215887 A 12/2015
WO 2011046559 A1 4/2011

OTHER PUBLICATIONS

"OASIS Topology and Orchestration Specification for Cloud Applications (TOSCA) TC", [online], OASIS, Retrieved Oct. 12, 2016, pp. 1-5, https://www.oasis-open.org/committees/tc_home.php?wg_abbrev=tosca#overview.

Numata, S., et al., "A Study of system change management using configuration management data from automatic building script", IEICE Technical Report, 2016, vol. 116, No. 124, pp. 45-50 (7 pages).

International Search Report, dated Dec. 12, 2017 from the International Bureau in counterpart International application No. PCT/JP2017/036363

"Network Functions Virtualisation (NFV); Management and Orchestration", [online], ETSI GS NFV-MAN 001, V1.1.1, Oct. 12, 2016, pp. 1-184, www/etsi.org/deliver.

"AWS CloudFormation", [online], AWS, Oct. 12, 2016, pp. 1-9, https://aws.amazon.com/jp/cloudformation/.

Written Opinion, dated Dec. 12, 2017 from the International Bureau in counterpart International application No. PCT/JP2017/036363.

\* cited by examiner

RELATION AMONG STATES APPENDING DEVICE, RELATION AMONG STATES APPENDING METHOD, AND RELATION AMONG STATES APPENDING PROGRAM

This application is a National Stage Entry of PCT/JP2017/036363 filed on Oct. 5, 2017, which claims priority from Japanese Patent Application 2016-209490 filed on Oct. 26, 2016, the contents of all of which are incorporated herein by reference, in their entirety.

TECHNICAL FIELD

The present invention relates to a relation among states appending device, a relation among states appending method, and a relation among states appending program.

BACKGROUND ART

The purpose of change management is to reduce the labor of an administrator of a system to be changed and the labor of a change operator that is incurred when the system is changed and to reduce the influence on a user of the system to be changed.

In the case where the system to be changed is a complicated system including a plurality of components, the change operation becomes complicated. In the case where the change operation is complicated, the labor of the change operator or the labor of the administrator who supervises the operation of the change operator increases. That is, the influence on the user of the system to be changed also increases.

In particular, in the case where there is a limitation on the state (hereinafter referred to as "state limitation") between components included in the system, it is required to consider the order of change operations of respective components, and thus the change operation tends to be complicated. A state limitation between components may be, for example, in the case where a system to be changed includes a component A and a component B, such a relation between the two elements as that the component B is required to function normally in order for the component A to function normally.

In the case of the above example, the condition for the component A to normally function is that the component B functions normally beforehand. Hereinafter, the above relation is called a previous state limitation. In the operation procedure for configuring the system including the component A and the component B, there is an order such as that the component B is configured first and then the component A is configured.

Furthermore, in the case where the operation on a component affects another component, it is required to consider the order of the change procedure on the basis of the influence on the other component, and thus the change operation tends to be complicated.

For example, in the case where a system to be changed includes a component C and a component D and the component C is over the component D, replacement of the component D may require a procedure for incidentally moving the component C.

Hereinafter, the above relation is called a follow-up state limitation. The reason for this is because the above relation represents that the state of the component C changes afterwards, accompanying the replacement of the component D.

A system that automatically generates a plan of work required for change of a system while considering previous state limitations and follow-up state limitations as described above is called a change management system. In a change management system, information related to state limitations among components and information related to operation on components are defined in advance.

By using the above change management system, an administrator can efficiently generate an operation procedure effective for execution of complicated change operation. In addition, the operator can also efficiently execute the change operation in accordance with the generated effective operation procedure. That is, when the change management system is used, it is expected that the influence on the user of the system to be changed will also be reduced.

Many related researches and related products are already known with regard to the change management system as described above. For example, PTL 1 discloses a technology of generating a change operation procedure by defining a previous state limitation between operation states of each component.

In the method of expressing the state and limitation relation of components by a state transition diagram, generally, selection of the method of mutual conversion between system design information and the state transition diagram is a challenge. PTL 2 describes a method of efficiently converting a model having a state into a state transition diagram that can be easily handled.

NPL 1 describes a technology of automatically changing settings of a target system when setting parameters of each component and the order of setting actions are given.

NPL 2 and NPL 3 further prescribe a lifecycle framework which is used also for system construction in addition to system change. In the prescribed framework, it is assumed that a change procedure of a system is given by some external factor such as manual input. However, it is not assumed to directly relate the management of the system configuration and derivation of the change procedure.

NPL 4 describes a technology that predicts and updates relevant Amazon Web Services (AWS) (registered trademark) resources in a predictable manner, and allows developers and system administrators to easily generate and manage the AWS resources. A user using the technology described in NPL 4 can describe all dependency relations and parameters at the time of execution necessary for execution of AWS resources and applications of AWS resources by using a template.

In addition, PTL 3 describes a technology of confirming consistency between two or more change procedures, and presenting a correct work flow when inconsistency is confirmed. The technology described in PTL 3 is intended to solve conflicts that exist among a plurality of different change procedures and does not contribute to derivation of a change procedure for a single target to be changed.

CITATION LIST

Patent Literature

PTL 1: Japanese Patent Application Laid-Open No. 2015-215885
PTL 2: Japanese Patent Application Laid-Open No. 2015-215887
PTL 3: Japanese Patent No. 5229223

Non Patent Literature

NPL 1: "An Overview of Chef," [online], CHEF DOCUMENTS, Retrieved on Oct. 12, 2016

NPL 2: "OASIS Topology and Orchestration Specification for Cloud Applications," [online], OASIS, Retrieved on Oct. 12, 2016

NPL 3: "Network Functions Virtualisation (NFV); Management and Orchestration," [online], ETSI, Retrieved on Oct. 12, 2016

NPL 4: "AWS CloudFormation," [online], AWS, Retrieved on Oct. 12, 2016

SUMMARY OF INVENTION

Technical Problem

The technology described in PTL 1 and the technology described in PTL 2 are for deriving a procedure for changing a system to the final state requested by user on the basis of a predefined previous state limitation. However, neither PTL 1 nor PTL 2 describes how to handle follow-up state limitations.

Therefore, a user cannot input a follow-up state limitation, which is often required to be defined upon system change, to a change management system employing the technology described in PTL 1 or the technology described in PTL 2.

Furthermore, neither the technology related to the procedure generation described in PTL 1 nor the technology related to the procedure generation described in PTL 2 uses a procedure generation method that considers a follow-up state limitation to compute the procedure. That is, the technology described in PTL 1 and the technology described in PTL 2 lack a mechanism for handling follow-up state limitations in both the input processing and the computation processing.

In addition, the technology described in NPL 1 and the technology described in NPL 4 handle only state limitations between specifically specified elements such as a relation between a virtual machine (VM) and a network interface card (NIC). That is, the user cannot append a state limitation on a desired managed object to the change management system employing the technology described in NPL 1 or the technology described in NPL 4.

In addition, although the technology described in the NPL 2 and the technology described in the NPL 3 have a mechanism that allows a user to add a managed object as appropriate, a function for generating a procedure in which state limitations are considered is not implemented.

That is, a user is required to manually input the procedure itself to the change management system employing the technology described in NPL 2 or the technology described in NPL 3. Since the change procedure is generated manually, there is a limit to change patterns and the number of changes that can be handled.

Purpose of Invention

Therefore, an object of the present invention is to provide a relation among states appending device, a relation among states appending method, and a relation among states appending program capable of solving the above disadvantages and generating a change procedure of a system configuration in which a follow-up state limitation relating to a desired managed object is considered.

Solution to Problem

A relation among states appending device according to the present invention includes: a storage means which stores, for each relation among constituent elements of a system, a plurality of instances of inter-state information which indicates relations among states of the constituent elements wherein a follow-up state limitation is included which represents a relation between a state transition of the constituent elements of the system and prescribed states to which the constituent elements transition after the state transition has been executed; and an appending means which appends the relations among the states of the constituent elements to an inputted system configuration definition, using the inter-state information which corresponds to the relations among the constituent elements which are included in the configuration definition.

A relation among states appending method according to the present invention includes: storing, for each relation among constituent elements of a system, a plurality of instances of inter-state information which indicates relations among states of the constituent elements wherein a follow-up state limitation is included which represents a relation between a state transition of the constituent elements of the system and prescribed states to which the constituent elements transition after the state transition has been executed; and appending the relations among the states of the constituent elements to an inputted system configuration definition, using the inter-state information which corresponds to the relations among the constituent elements which are included in the configuration definition.

A relation among states appending program according to the present invention for causing a computer to execute: storage processing for storing, for each relation among constituent elements of a system, a plurality of instances of inter-state information which indicates relations among states of the constituent elements wherein a follow-up state limitation is included which represents a relation between a state transition of the constituent elements of the system and prescribed states to which the constituent elements transition after the state transition has been executed; and appending processing for appending the relations among the states of the constituent elements to an inputted system configuration definition, using the inter-state information which corresponds to the relations among the constituent elements which are included in the configuration definition.

Advantageous Effects of Invention

The present invention enables generation of a change procedure of a system configuration, in which follow-up state limitations relating to any desired managed object are considered.

DESCRIPTION OF EMBODIMENTS

First Exemplary Embodiment

[Description of Configuration]

Figure 1:
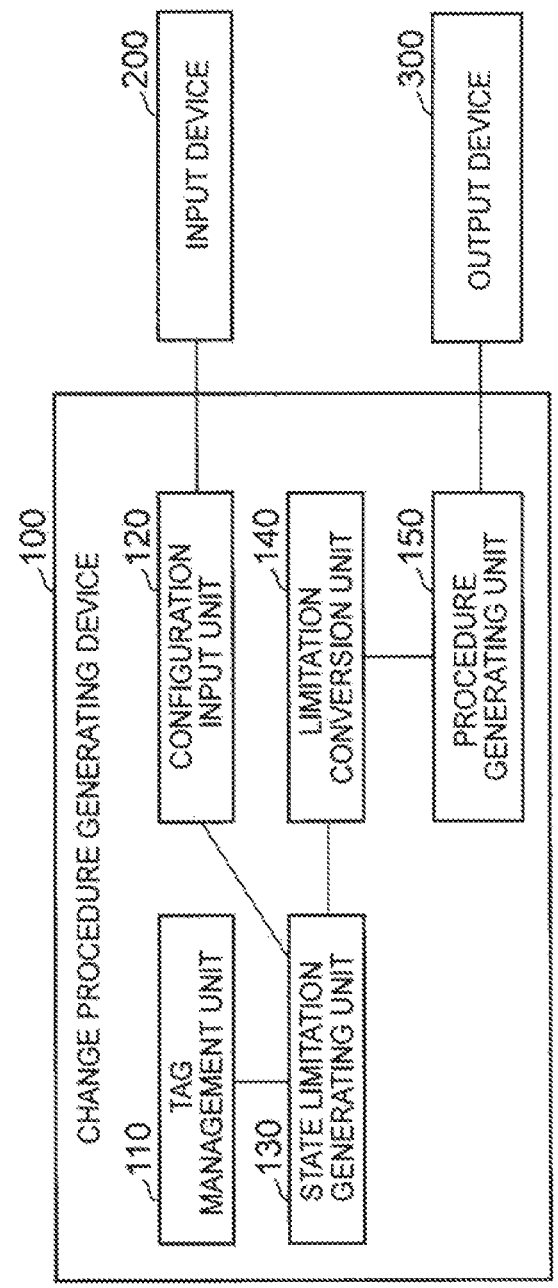
FIG. 1 is a block diagram showing a configuration example of a first exemplary embodiment of a change procedure generating device 100 according to the present invention.

Exemplary embodiments of the present invention will be described below with reference to the drawings. FIG. 1 is a block diagram showing a configuration example of a first exemplary embodiment of a change procedure generating device 100 according to the present invention.

As shown in FIG. 1, the change procedure generating device 100 according to the present exemplary embodiment includes a tag management unit 110, a configuration input unit 120, a state limitation generating unit 130, a limitation conversion unit 140, and a procedure generating unit 150.

Also as shown in FIG. 1, the change procedure generating device 100 is communicably connected to an input device 200 for inputting information to the change procedure generating device 100 via a communication network or the like. The change procedure generating device 100 is further communicably connected to an output device 300 for outputting a change procedure generated by the change procedure generating device 100 via a communication network or the like.

A user inputs, to the input device 200, as input information, information indicating a system configuration definition which is a definition of a group of constituent elements modeling the system, which is to be changed by a configuration change for which a change procedure is to be derived. The input information also reflects requirements for system configuration change.

The tag management unit 110 has a function of managing tags indicating relations between elements of a system configuration. Specifically, the tag management unit 110 manages tag definition information.

The configuration input unit 120 has a function of receiving input information from the input device 200. The configuration input unit 120 sends the received input information to the state limitation generating unit 130.

The state limitation generating unit 130 has a function of generating a state limitation by using the input information received from the configuration input unit 120 and the tag definition information managed by the tag management unit 110. The state limitation generating unit 130 sends the system configuration definition, to which the generated state limitation is appended, to the limitation conversion unit 140.

The limitation conversion unit 140 has a function of converting the state limitation appended to the received system configuration definition. The limitation conversion unit 140 sends the system configuration definition, the state limitation appended to which is changed, to the procedure generating unit 150.

The procedure generating unit 150 has a function of generating a change procedure of the system configuration on the basis of the received system configuration definition. The procedure generating unit 150 inputs the generated change procedure to the output device 300.

The output device 300 has a function of outputting the input change procedure. The output device 300 is, for example, a display device such as a liquid crystal display device, or a printing device such as a printer.

The input information of the present exemplary embodiment indicates a group of constituent elements modeling the system, which is to be changed by the configuration change for which the change procedure is to be derived. Individual constituent elements include states that the constituent element itself may be in. The system configuration change is defined by associating each of the current state and the changed state of each constituent element with a state that the constituent element may be in.

Figure 2:
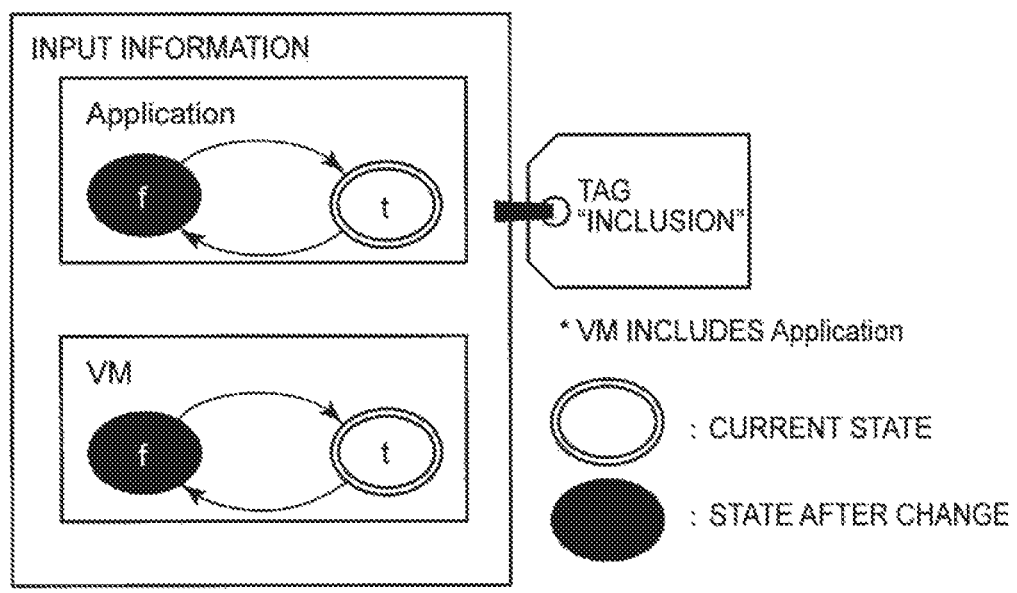
FIG. 2 is an explanatory diagram showing an example of input information input to an input device 200.

FIG. 2 is an explanatory diagram showing an example of input information input to the input device 200. The input information shown in FIG. 2 includes a constituent element representing a virtual machine and a constituent element representing an application. A rectangle within the input information shown in FIG. 2 represents a constituent element. A constituent element indicated as "VM" represents a virtual machine, and a constituent element indicated as "Application" represents an application.

An ellipse within a constituent element shown in FIG. 2 represents a state that the constituent element itself may be in. A character in an ellipse represents the name of the state. Also, an arrow between states represents state transition that the constituent element may execute. That is, each constituent element shown in FIG. 2 has a state "f" and a state "t" as possible states. The state "f" represents a state in which the constituent element does not exist. In addition, the state "t" represents a state in which the constituent element is deployed.

Moreover, as shown in FIG. 2, an ellipse of double lines represents the current state of the constituent element. A black ellipse represents the state of the constituent element after the change. That is, the current states of the two constituent elements shown in FIG. 2 are both state "t." In addition, the states of the two constituent elements after the change shown in FIG. 2 are both state "f."

In order to change the state of each of the constituent elements shown in FIG. 2, it is required to satisfy the state limitation of an opposite constituent element. Note that an opposite constituent element is another constituent element in relation to a constituent element. Specifically, the opposite constituent element of the constituent element "Application" is the constituent element "VM." Also, the opposite constituent element of the constituent element "VM" is the constituent element "Application."

In order to derive a change procedure, it is required to consider a state limitation of an opposite constituent element. However, the input information shown in FIG. 2 includes no specific information related to the state limitation. Instead of specific information, the input information shown in FIG. 2 is appended with a tag "inclusion."

A user selects a tag representing the relation between constituent elements included in the system to be changed from a set of tags managed by the tag management unit 110.

The user then generates input information by combining an identifier of the selected tag with the constituent elements of the system.

The user provides the generated input information to the change procedure generating device 100 via the input device 200. In the input information shown in FIG. 2, the relation that the application operates in the virtual machine is represented by the tag "inclusion."

That is, the tag "inclusion" represents a relation in which one constituent element is dependent on another constituent element. The tag "inclusion" shown in FIG. 2 represents a relation in which the constituent element "VM" includes the constituent element "Application," that is, the constituent element "Application" is dependent on the constituent element "VM."

Note that the tag of this exemplary embodiment is not limited to the example shown in FIG. 2. In addition to "inclusion," tag types of this exemplary embodiment include "allocation" representing a relation between a shared resource and a constituent element temporarily occupying the shared resource. The tag "allocation" can represent, for example, the relation between an Internet Protocol (IP) address and a virtual machine to which the IP address is temporarily allocated.

In addition to the above, the tag types of this exemplary embodiment also include "exclusion" representing a relation that always only one constituent element is valid within a group. The tag "exclusion" can represent, for example, the relation between a group of routers in the same group of the Virtual Router Redundancy Protocol (VRRP) and the only one valid designated router in the group of routers.

The tags of this exemplary embodiment can represent various relations other than the above examples. Moreover, constituent elements to be represented by each tag are not limited to specific constituent elements such as virtual machines or applications. Each tag can represent a relation between various constituent elements.

In addition, the tag appended to the input information shown in FIG. 2 may not be given by a user. For example, the configuration input unit 120 may identify the relation between the constituent elements included in the input information and append, to the input information, the tag representing the identified relation.

Figure 3:
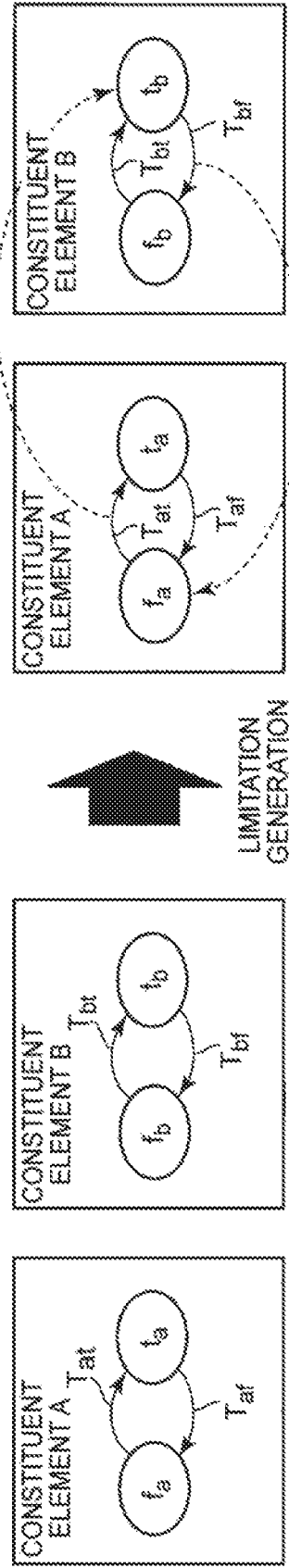
FIG. 3 is an explanatory diagram showing an example of tag definition information, in which a relation required for generation of limitation information is defined.

FIG. 3 is an explanatory diagram showing an example of tag definition information, in which a relation required for generation of limitation information is defined. The tag definition information includes an identifier for uniquely identifying the tag and a limitation generation equation used for generation of the limitation information.

The identifier shown in FIG. 3 is "inclusion." That is, FIG. 3 shows definition information of the tag "inclusion" shown in FIG. 2.

A limitation generation equation is a mathematical formula defining a specific state limitation appended to a constituent element associated with a tag. Limitation generation equations in FIG. 3 are applied to a system configuration including two constituent elements of a constituent element A and a constituent element B having two states of a state "f" and a state "t" as possible states.

FIG. 3 shows configurations of the constituent elements A and B at the left. Note that a state "$t_a$" in FIG. 3 represents the state "t" of the constituent element A. Likewise, a state "$f_a$" is the state "f" of the constituent element A. The same applies to the respective states of the constituent element B.

The previous state limitation $C_{pre}=[T_{at}, t_b]$ in FIG. 3 expresses the relation that, in order for state transition "$T_{at}$" to be executed, that is, in order for the constituent element A to transition to the state "t", a state "$t_b$" is required in advance, that is, the constituent element B is required to be in the state "t."

In addition, the follow-up state limitation $C_{pos}=[T_{bf}, f_a]$ in FIG. 3 expresses the relation that, when state transition "$T_{bf}$" is executed, that is, when the constituent element B transitions to the state "f", transition to the state "$f_a$", that is, transition of the constituent element A to the state "f" is performed afterwards.

FIG. 3 shows the configurations of the constituent elements A and B reflecting the above relations at the right. As shown in the right of FIG. 3, a previous state limitation is specified for the state "$t_b$" from the state transition "$T_{at}$." Likewise, a follow-up state limitation is specified for the state "$f_a$" from the state transition "$T_{bf}$."

When receiving the input information as shown in FIG. 2 from the configuration input unit 120, the state limitation generating unit 130 acquires, from the tag management unit 110, the tag definition information corresponding to the tag identifier described in the input information as shown in FIG. 3. The state limitation generating unit 130 generates a specific state limitation using the acquired input information and tag definition information.

Figure 4:
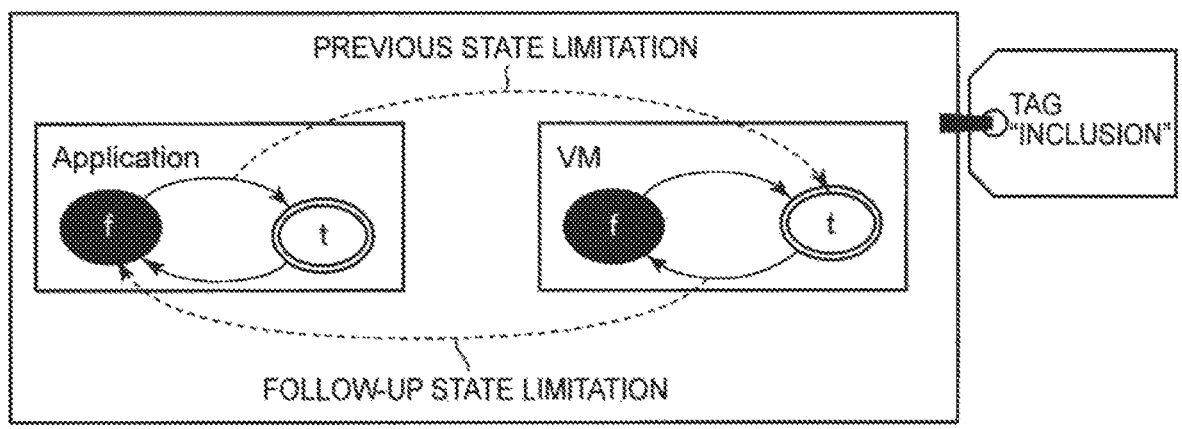
FIG. 4 is an explanatory diagram showing a specific example of state limitations generated by a state limitation generating unit 130.

FIG. 4 is an explanatory diagram showing a specific example of state limitations generated by the state limitation generating unit 130. The state limitations shown in FIG. 4 are generated by the state limitation generating unit 130 when the input information shown in FIG. 2 and the tag definition information shown in FIG. 3 are provided.

Referring to the input information shown in FIG. 2, the state limitation generating unit 130 finds that an including constituent element is the constituent element "VM" and that the included constituent element is the constituent element "Application." Therefore, the state limitation generating unit 130 finds that the constituent element A in the tag definition information corresponds to the constituent element "Application" and that the constituent element B corresponds to the constituent element "VM."

The state limitation generating unit 130 can apply the limitation generation equation in the tag definition information shown in FIG. 3 to the two constituent elements of the constituent element "VM" and the constituent element "Application." By applying the limitation generation equation, the state limitation generating unit 130 generates a previous state limitation that it is required for the constituent element "VM" to be in the state "t" in order for the constituent element "Application" in FIG. 4 to transition from the state "f" to the state "t."

Next, the state limitation generating unit 130 generates a follow-up state limitation that the constituent element "Application" transitions to the state "f" when the constituent element "Application" is in the state "t" after transition of the constituent element "VM" in FIG. 4 from the state "t" to the state "f." The state limitation generating unit 130 sends the system configuration definition to which the specific state limitation is appended to the limitation conversion unit 140.

Figure 5:
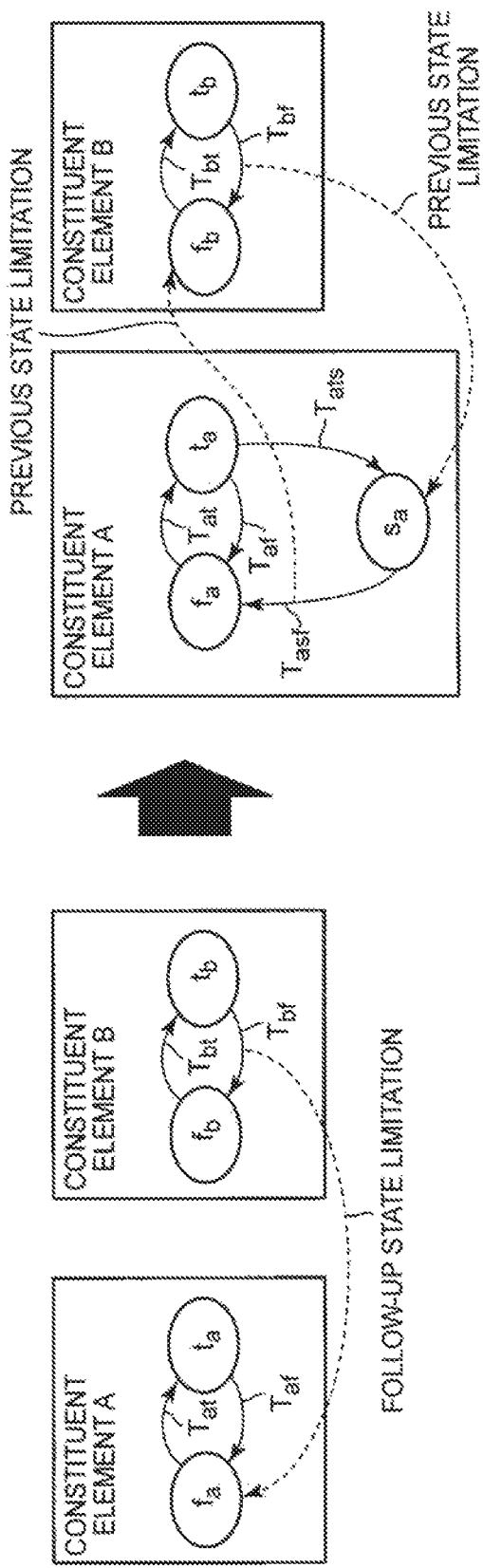
FIG. 5 is an explanatory diagram showing exemplary conversion processing from a follow-up state limitation into a previous state limitation by a limitation conversion unit 140.

The limitation conversion unit 140 of the present exemplary embodiment converts the follow-up state limitation appended to the sent system configuration definition into a previous state limitation. FIG. 5 is an explanatory diagram showing exemplary conversion processing from a follow-up state limitation into a previous state limitation by the limitation conversion unit 140.

FIG. 5 shows a system configuration definition to which a follow-up state limitation is appended at the left. The follow-up state limitation $[T_{bf}, f_a]$ in the left of FIG. 5 indicates that when the state transition "$T_{bf}$" is executed, the constituent element A transitions to the state "$f_a$."

In order to convert the follow-up state limitation shown in the left of FIG. 5 into a previous state limitation, the limitation conversion unit 140 first adds a new state "$s_a$" to the constituent element A as shown in the right of FIG. 5. Transition to the state "$s_a$" is only possible only from the state "$t_a$." In addition, the state "$s_a$" can transition only to the state "$f_a$."

Furthermore, a state transition "$T_{ats}$" itself shown in the right of FIG. 5 does not change the specific state of the constituent element A at all. That is, a user does not input, to the constituent element A, the state "$s_a$" itself as a state after the transition. Likewise, a, the state transition "$T_{asf}$" itself shown in the right of FIG. 5 does not change the specific state of the constituent element A at all.

That is, the state "$s_a$" is a state to which the constituent element A can transition only in the middle of a series of change operations. The constituent element A that has transitioned to the state "$s_a$" always transitions to the state "$f_a$." That is, the state "$s_a$" indicates that the state of the constituent element A is to transition to the state "$f_a$" afterwards.

Meanwhile, the limitation conversion unit 140 weights each path in order for the procedure generating unit 150 can select from a path that transitions to the state "$f_a$" via the state "$s_a$" and a path that directly transitions to the state "$f_a$" when the procedure generating unit 150 generates a procedure later.

The value of a weight given to each of the paths is set as appropriate such that the path transitioning to the state "$f_a$" via the state "$s_a$" is weighted less than the path transitioning directly to the state "$f_a$." That is, since the path transitioning to the state "$f_a$" via the state "$s_a$" is more preferable as an option, the value of the weight is set such that the cost incurred when selected is reduced.

The limitation conversion unit 140 converts the follow-up state limitation into a previous state limitation by replacing the follow-up state limitation [$T_{bf}$, $f_a$] with a previous state limitation [$T_{bf}$, $s_a$] in which the newly added state "$s_a$" is used.

In addition, the limitation conversion unit 140 adds a previous state limitation [$T_{asf}$, $f_b$] to the system configuration definition in order for the state transition "$T_{asf}$" to be executed after execution of the state transition "$T_{bf}$", that is, after the constituent element B transitions to the state "f." FIG. 5 shows the system configuration definition appended with the previous state limitation after the conversion at the right.

Although the basic method of converting a follow-up state limitation is as described above, a case where further adjustment of a state limitation is required depending on a tag type representing a relation between constituent elements will be described below.

Figure 6:
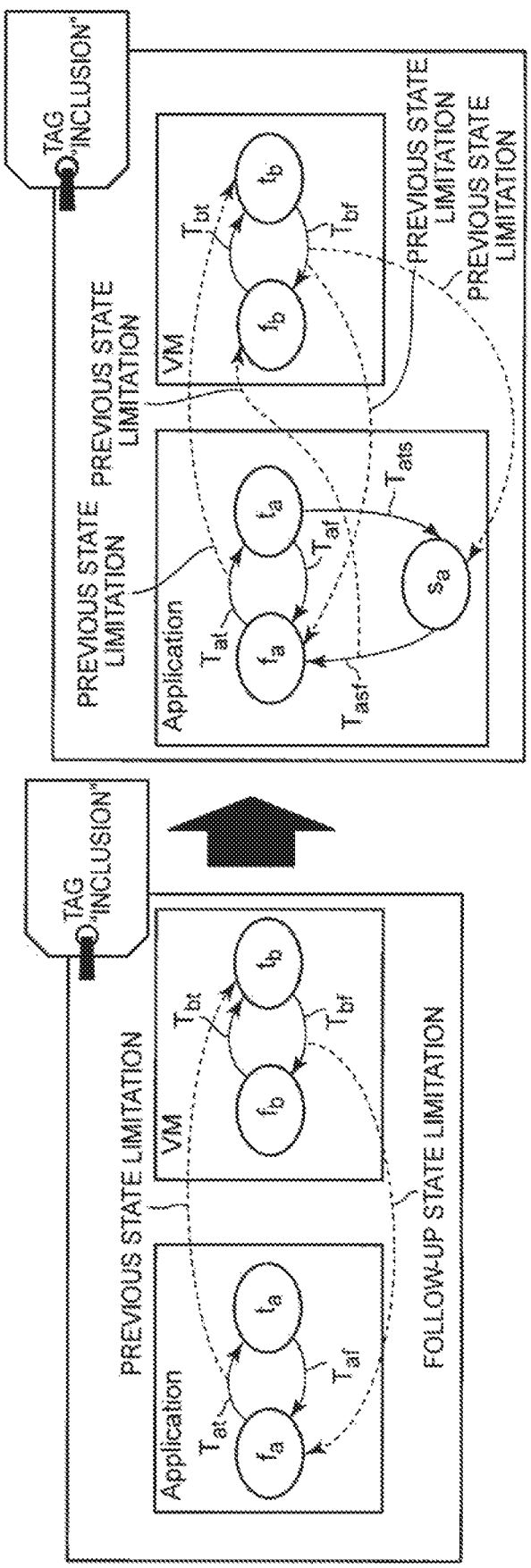
FIG. 6 is an explanatory diagram showing an exemplary conversion of a follow-up state limitation to a previous state limitation in a system configuration definition to which a state limitation is appended.

FIG. 6 is an explanatory diagram showing an exemplary conversion of a follow-up state limitation to a previous state limitation in a system configuration definition appended with a state limitation. FIG. 6 shows a system configuration including the constituent element "Application" and the constituent element "VM" appended with the state limitation shown in FIG. 4 at the left.

FIG. 6 shows a system configuration in which the follow-up state limitation appended by the limitation conversion unit 140 has been converted into a previous state limitation at the right. Referring to the right of FIG. 6, the state "$s_a$" is added by the basic conversion processing shown in FIG. 5, and the previous state limitation [$T_{bf}$, $s_a$] is generated.

Moreover, the previous state limitation [$T_{bf}$, $f_a$] is added as a state limitation unique to the tag "inclusion."

In the case where a plurality of previous state limitations are imposed on one state transition, the logic sum (OR) of the plurality of previous state limitations is used. That is, if any one of the plurality of previous state limitations being imposed is satisfied, the state transition is executed.

As shown in the right of FIG. 6, two state limitations of the previous state limitation [$T_{bf}$, $s_a$] and the previous state limitation [$T_{bf}$, $f_a$] are imposed on the same state transition "$T_{bf}$." As described above, in this exemplary embodiment, if one of the previous state limitations is satisfied, the state limitation imposed on the state transition "$T_{bf}$" is regarded as being satisfied.

The above two previous state limitations require that state "$f_a$" or the state "$s_a$" be satisfied when state transition "$T_{bf}$" is executed, that is, when the constituent element "VM" is deleted. The above means that the constituent element "Application" has been deleted or that the constituent element "Application" is to be necessarily deleted.

The reason why the previous state limitation [$T_{bf}$, $f_a$] is added is to prevent derivation of a procedure that goes through the state "$s_a$" even when the constituent element "Application" has been deleted and thus the constituent element "VM" can be deleted without any problem.

The limitation conversion unit 140 also manages adjustment rules of state limitations unique to each tag as described above. The limitation conversion unit 140 executes the basic conversion processing shown in FIG. 5 and the conversion processing unique to the tag shown in FIG. 6 together. The limitation conversion unit 140 sends the system configuration definition appended with only the generated previous state limitation to the procedure generating unit 150.

The procedure generating unit 150 computes a change procedure of the system configuration on the basis of the received system configuration definition. The procedure computation method that the procedure generating unit 150 uses to compute a change procedure is the method described in PTL 1.

The procedure generating unit 150 can derive a solution by deeming the problem for generating the change procedure of the system configuration as problem of the shortest path for a general oriented graph. The procedure generating unit 150 computes the procedure using an existing algorithm for solving the shortest path problem such as the Dijkstra method. The algorithm that the procedure generating unit 150 uses to derive a solution may be any algorithm other than the algorithm described in PTL 1 as long as the algorithm solves the shortest path problem.

Figure 7:
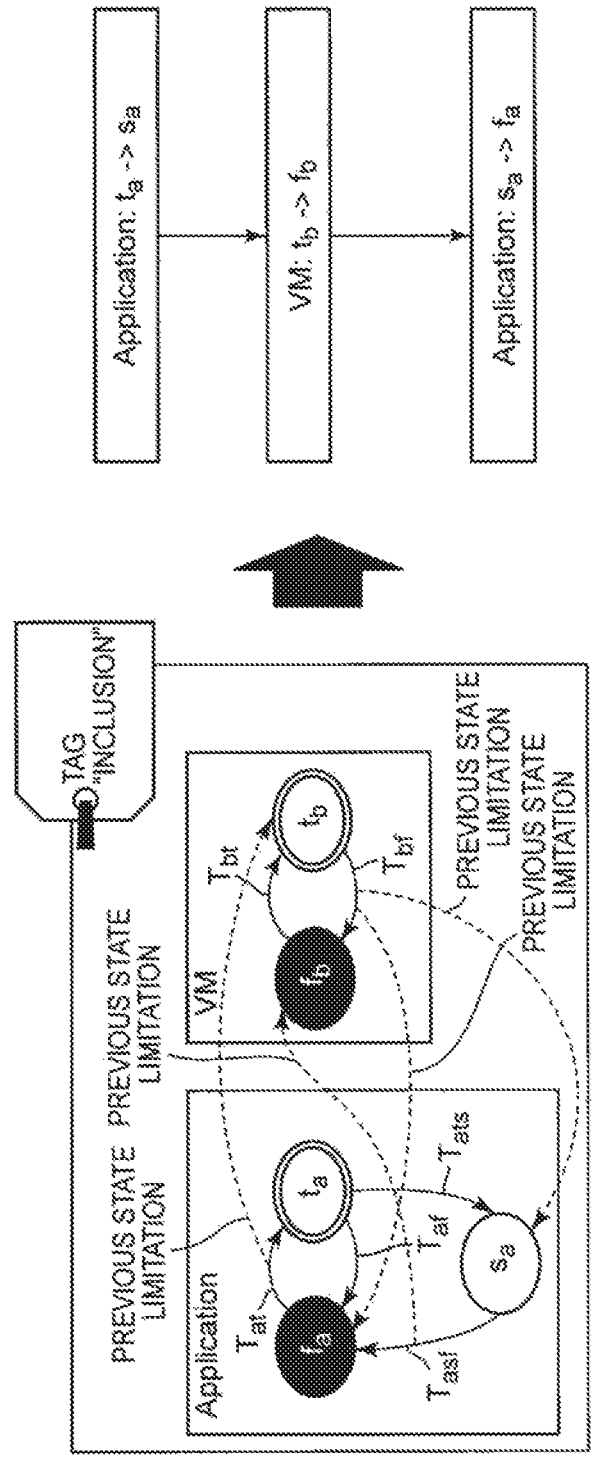
FIG. 7 is an explanatory diagram showing an example of a system configuration definition input to a procedure generating unit 150 and an output change procedure.

The procedure generating unit 150 inputs the generated change procedure to the output device 300. FIG. 7 is an explanatory diagram showing an example of a system configuration definition input to the procedure generating unit 150 and an output change procedure.

FIG. 7 shows an example of a system configuration definition input to the procedure generating unit 150 at the left. The system configuration definition shown in the left of FIG. 7 is the system configuration definition for the input information shown in FIG. 2. The system configuration definition shown in the left of FIG. 7 is the system configuration definition after the conversion processing on the follow-up state limitation shown in FIG. 6 has been performed on the system configuration definition shown in FIG. 4.

FIG. 7 shows an example of a change procedure generated by the procedure generating unit 150 at the right. The change procedure shown in the right of FIG. 7 includes a procedure for transitioning the constituent element "Application" from the state "$t_a$" to the state "$s_a$", a procedure for transitioning the constituent element "VM" from the state "$t_b$" to the state "$f_b$", and a procedure for transitioning the constituent element "Application" from the state "$s_a$" to the state "$f_a$."

On the basis of the state limitations appended by the state limitation generating unit 130 and the limitation conversion unit 140, the procedure generating unit 150 derives a procedure for deleting the constituent element "VM" and the constituent element "Application" as described above. Since the constituent element "VM" is deleted first, in relation to the constituent element "Application", derived is not a deletion procedure, in which a state transition "$T_{af}$" in which the constituent element "Application" is directly deleted is executed, but a passive deletion procedure in which the state "$s_a$" is went through, whereby the state transition "$T_{asf}$" is executed afterwards.

[Description of Operation]

Figure 8:
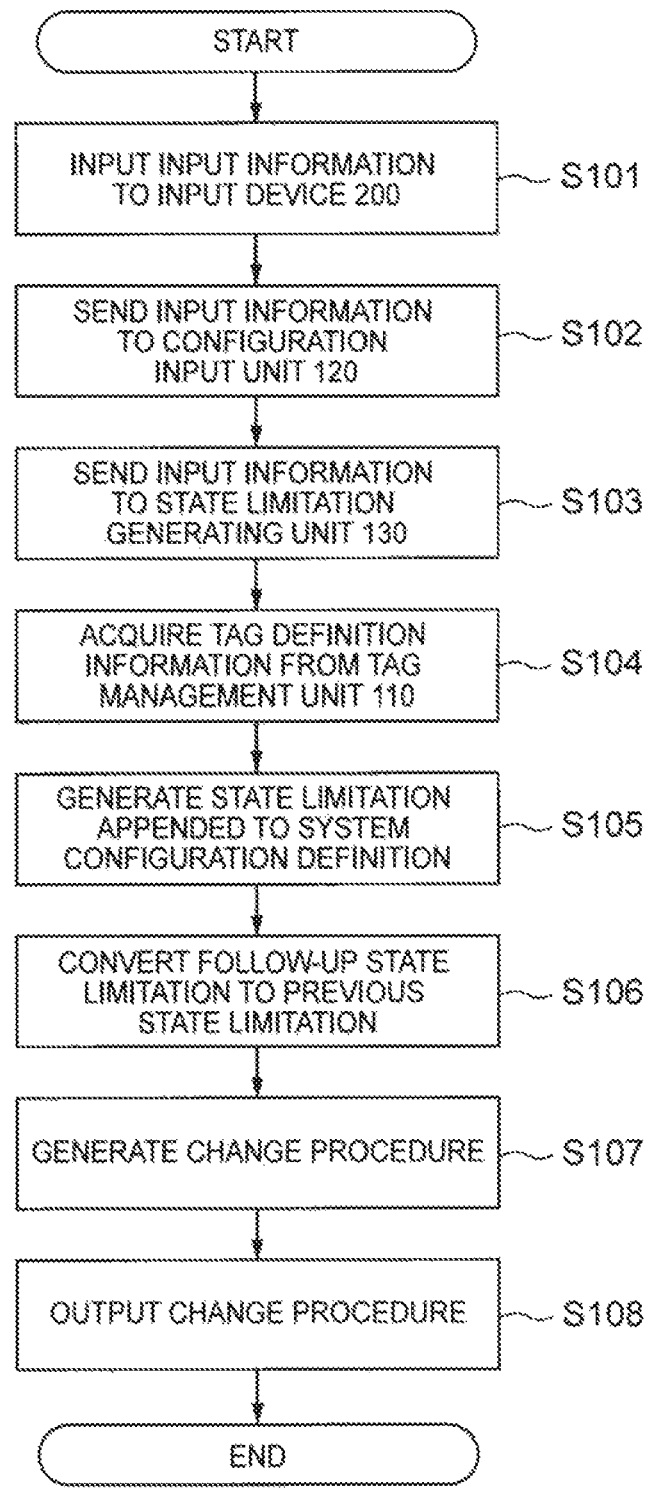
FIG. 8 is a flowchart showing operation of change procedure generating processing by the change procedure generating device 100 according to the present exemplary embodiment.

Hereinafter, the operation of the change procedure generating device 100 of the present exemplary embodiment will be described with reference to FIG. 8. FIG. 8 is a flowchart showing operation of change procedure generating processing by the change procedure generating device 100 according to the present exemplary embodiment.

A user preliminarily registers an expression for generating a previous state limitation and an expression for generating a follow-up state limitation for each type of relations between constituent elements in the tag management unit 110 of the change procedure generating device 100.

The user inputs input information including a definition of a group of constituent elements to the input device 200 (step S101). The input device 200 sends the input information, input thereto, to the configuration input unit 120 (step S102).

Next, the configuration input unit 120 sends the input information received from the input device 200 to the state limitation generating unit 130 (step S103). Next, the state limitation generating unit 130 acquires, from the tag management unit 110, tag definition information corresponding to an identifier of a tag given in a system configuration definition indicated by the input information received from the configuration input unit 120 (step S104).

Next, the state limitation generating unit 130 generates a state limitation to be appended to the system configuration definition by using the input information and the acquired tag definition information (step S105). The state limitation generating unit 130 sends the system configuration definition appended with the state limitation to the limitation conversion unit 140.

Next, the limitation conversion unit 140 executes addition of a state to constituent elements and resetting of the limitation condition to convert a follow-up state limitation, out of the state limitations appended to the received system configuration definition, to a previous state limitation (step S106). The limitation conversion unit 140 sends the system configuration definition, converted into a definition from which a procedure can be generated with follow-up state limitations having been converted, to the procedure generating unit 150.

Next, the procedure generating unit 150 generates a change procedure according to the change requirements in the received system configuration definition (step S107). The procedure generating unit 150 inputs the generated change procedure to the output device 300.

Then, the output device 300 outputs the input change procedure (step S108). When the change procedure has been output, the change procedure generating device 100 terminates the change procedure generating processing.

When the change procedure generating processing described above is executed, the change procedure generating device 100 can generate a change plan that satisfies state limitations for a group of constituent elements including a state, which affects a state of another constituent element after a state transition of the constituent element of the system is executed.

[Description of Effects]

The change procedure generating device 100 according to the present exemplary embodiment assigns a relation between constituent elements, which are defined in advance and not limited to a specific target, to tags representing a relation between constituent elements desirably defined by a user, and thereby generates a state limitation between constituent elements including a follow-up state limitation. The change procedure generating device 100 further converts the follow-up state limitation into a previous state limitation and generates a change procedure of the system configuration.

The tag definition information contains information related to relations (state limitations) between states of constituent elements associated with a tag. With a user assigning specific constituent elements such as a specific virtual machine and a specific application to a tag, the state limitation generating unit 130 of the change procedure generating device 100 generates a specific relation between states.

When converting a follow-up state limitation into a previous state limitation, the limitation conversion unit 140 adds a virtual state that transitions to a prescribed state afterwards, and sets the previous state limitation to the added state. Furthermore, the limitation conversion unit 140 adjusts the state limitations depending on the type of the tag such that consistency is maintained between the added previous state limitation and previous state limitations having been set.

The change procedure generating device 100 of the present exemplary embodiment is capable of generating a state limitation including follow-up state limitations by representing a relation between constituent elements by a tag that can be easily input for a plurality of constituent elements desirably specified by a user. In addition, the change procedure generating device 100 is capable of deriving an update procedure of a group of constituent elements including generated follow-up state limitations by using a procedure computation method in which only previous state limitations are processing targets.

A user using the change procedure generating device according to the present exemplary embodiment can generate a change procedure depending on change requirements of the system only by designating a system configuration definition reflecting the change requirements of the system configuration and a tag representing the relation between constituent elements in the system configuration definition.

Figure 9:
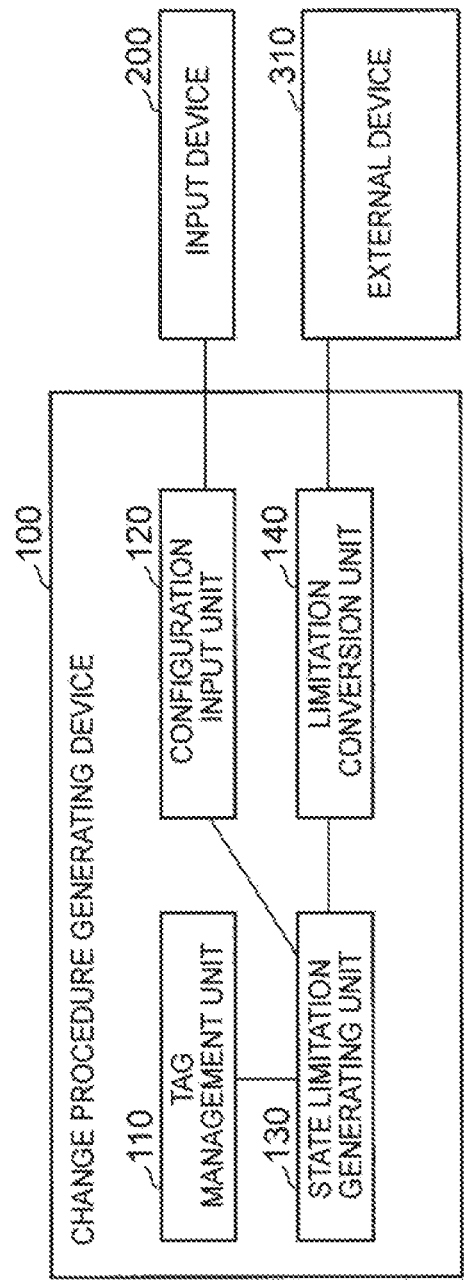
FIG. 9 is a block diagram showing another configuration example of the first exemplary embodiment of the change procedure generating device 100 according to the present invention.

Note that, as shown in FIG. 9, the change procedure generating device 100 of the present exemplary embodiment may not include the procedure generating unit 150. FIG. 9 is a block diagram showing another configuration example of the first exemplary embodiment of the change procedure generating device 100 according to the present invention.

A change procedure generating device 100 shown in FIG. 9 only adds or supplements a state limitation to a system configuration definition and does not perform procedure generation processing. That is, a limitation conversion unit 140 of the change procedure generating device 100 shown in FIG. 9 inputs a system configuration definition, in which a follow-up state limitation is converted, to an external device 310 as it is.

The external device 310 may be, for example, a procedure deriving device capable of handling previous state limitations only. That is, the change procedure generating device 100 shown in FIG. 9 is a device that inputs a generated system configuration definition to another procedure deriving device.

A user using the change procedure generating device 100 shown in FIG. 9 is capable of providing a system configuration definition that enables derivation of a procedure, in which follow-up state limitations are considered, to another procedure deriving device capable of handling only previous state limitations only be designating a system configuration definition reflecting change requirements of the system configuration and a tag representing the relation between constituent elements in the system configuration definition.

Note that the change procedure generating device 100 of the present exemplary embodiment is implemented by, for example, a central processing unit (CPU) that executes processing in accordance with a program stored in a storage medium. That is, the tag management unit 110, the configuration input unit 120, the state limitation generating unit 130, the limitation conversion unit 140, and the procedure generating unit 150 are implemented by, for example, a CPU that executes processing in accordance with program control.

Furthermore, each of the units in the change procedure generating device 100 of the present exemplary embodiment may be implemented by a hardware circuit. As an example, the tag management unit 110, the configuration input unit 120, the state limitation generating unit 130, the limitation conversion unit 140, and the procedure generating unit 150 are implemented separately by large scale integrations (LSIs). Alternatively, the above units may be implemented by a single LSI.

Figure 10:
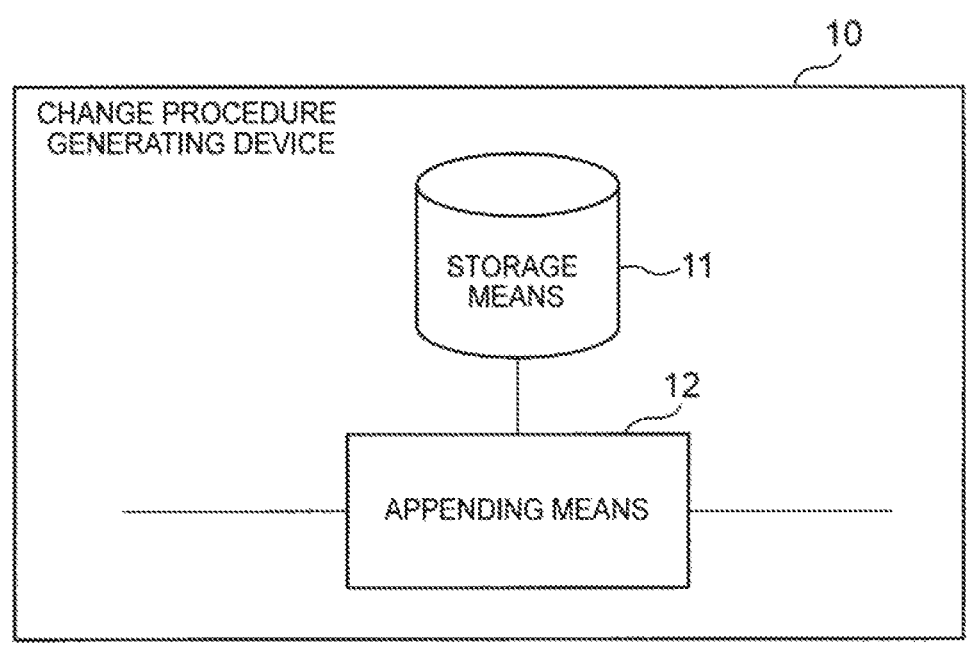
FIG. 10 is a block diagram showing an outline of the change procedure generating device according to the present invention.

Next, an outline of the present invention will be described. FIG. 10 is a block diagram showing an outline of the change procedure generating device according to the present invention. A change procedure generating device 10 according to the present invention includes: a storage means 11 (for example, tag management unit 110) which stores, for each relation among constituent elements of a system, a plurality of instances of inter-state information (for example, tag definition information) which indicates relations among states of the constituent elements wherein a follow-up state limitation is included which represents a relation between a state transition of the constituent elements of the system and prescribed states to which the constituent elements transition after the state transition has been executed; and an appending means 12 (for example, state limitation generating unit 130) which appends the relations among the states of the constituent elements to an inputted system configuration definition, using the inter-state information which corresponds to the relations among the constituent elements which are included in the configuration definition.

With such a configuration, the change procedure generating device can generate of a change procedure of the system configuration, in which follow-up state limitations relating to any desired managed object are considered.

The change procedure generating device 10 may further include a conversion means (for example, limitation conversion unit 140) which converts a follow-up state limitation appended to the system configuration definition into a previous state limitation, representing a relation between a prescribed state of the constituent element of the system and a state transition executed after the constituent element transitions to the prescribed state.

With such a configuration, the change procedure generating device can generate of a change procedure of the system configuration by using a procedure computation method which is capable of processing only the previous state limitations.

The change procedure generating device 10 may further include a generating means (for example, procedure generating unit 150) which generates a change procedure for implementing a configuration change of the system on the basis of the system configuration definition, the follow-up state limitation appended thereto having been converted by the conversion means.

With such a configuration, the change procedure generating device can generate of a change procedure of the system configuration, in which previous state limitations and follow-up state limitations are considered.

Moreover, the conversion means may convert a follow-up state limitation into a previous state limitation representing a relation between a virtual state, added between a state transition represented by the follow-up state limitation and a prescribed state, and the state transition executed after the constituent element transitions to the virtual state.

With such a configuration, the change procedure generating device can convert the follow-up state limitation into the previous state limitation without changing the constituent element indicated by the system configuration definition.

The conversion means may add a previous state limitation to a system configuration definition such that the relation between states represented by a follow-up state limitation and the relation between states represented by the previous state limitation obtained by conversion from the follow-up state limitation are equivalent to each other.

With such a configuration, the change procedure generating device can generate a change procedure of the system configuration that does not include unnecessary procedures.

The inter-state information includes a rule used for generation of a relation between states of constituent elements, and the appending means 12 may use the rule to generate the relation between the states of the constituent elements to be appended to the system configuration definition.

Such a configuration allows the change procedure generating device to be compatible with more types of system configuration changes.

The present invention has been described above with reference to the exemplary embodiments and the examples; however, the present invention is not limited to the above exemplary embodiments or the examples. The configuration or details of the present invention may include various modifications that can be understood by a person skilled in the art within the scope of the present invention.

This application claims priority based on Japanese Patent Application No. 2016-209490 filed on Oct. 26, 2016, discloser of which is incorporated herein in its entirety.

INDUSTRIAL APPLICABILITY

The present invention is suitably applied to a system configuration management tool which automatically performs a change or an update. The present invention is suitably applied also to applications of tool products that establishes a deployment operation required for the operation of system constituent elements only by combining system constituent elements such as an application and a server and thereby performs the deployment.

REFERENCE SIGNS LIST 10, 100 Change procedure generating device
11 Storage means
12 Appending means
110 Tag management unit
120 Configuration input unit
130 State limitation generating unit
140 Limitation conversion unit
150 Procedure generating unit
200 Input device
300 Output device
310 External device

What is claimed is:

1. A relation among states appending device comprising:
a storage unit which stores, for each relation among constituent elements of a system, a plurality of instances of inter-state information which indicates relations among states of the constituent elements wherein a follow-up state limitation is included which represents a relation between a state transition of the constituent elements of the system and prescribed states to which the constituent elements transition after the state transition has been executed; and
an appending unit which appends the relations among the states of the constituent elements to an inputted system configuration definition, using the inter-state information which corresponds to the relations among the constituent elements which are included in the configuration definition.

2. The relation among states appending device according to claim 1, further comprising:
a conversion unit which converts a follow-up state limitation appended to the system configuration definition into a previous state limitation, representing a relation between a prescribed state of the constituent element of the system and a state transition executed after the constituent element transitions to the prescribed state.

3. The relation among states appending device according to claim 2, further comprising:
a generating unit which generates a change procedure for implementing a configuration change of the system on the basis of the system configuration definition, the follow-up state limitation appended thereto having been converted by the conversion means unit.

4. The relation among states appending device according claim 2,
wherein the conversion unit converts the follow-up state limitation into the previous state limitation representing a relation between a virtual state, added between a state transition represented by the follow-up state limitation and a prescribed state, and the state transition executed after the constituent element transitions to the virtual state.

5. The relation among states appending device according claim 2,
wherein the conversion unit adds the previous state limitation to the system configuration definition such that the relation between states represented by the follow-up state limitation and the relation between states represented by the previous state limitation obtained by conversion from the follow-up state limitation are equivalent to each other.

6. The relation among states device according claim 1,
wherein the inter-state information includes a rule used for generation of a relation between states of constituent elements, and
the appending unit uses the rule to generate the relation between the states of the constituent elements to be appended to the system configuration definition.

7. The relation among states appending device according to claim 3,
wherein the conversion unit converts the follow-up state limitation into the previous state limitation representing a relation between a virtual state, added between a state transition represented by the follow-up state limitation and a prescribed state, and the state transition executed after the constituent element transitions to the virtual state.

8. The relation among states appending device according to claim 3,
wherein the conversion unit adds the previous state limitation to the system configuration definition such that the relation between states represented by the follow-up state limitation and the relation between states represented by the previous state limitation obtained by conversion from the follow-up state limitation are equivalent to each other.

9. The relation among states appending device according to claim 4,
wherein the conversion unit adds the previous state limitation to the system configuration definition such that the relation between states represented by the follow-up state limitation and the relation between states represented by the previous state limitation obtained by conversion from the follow-up state limitation are equivalent to each other.

10. The relation among states appending device according to claim 7,
wherein the conversion unit adds the previous state limitation to the system configuration definition such that the relation between states represented by the follow-up state limitation and the relation between states represented by the previous state limitation obtained by conversion from the follow-up state limitation are equivalent to each other.

11. The relation among states appending device according to claim 2,
wherein the inter-state information includes a rule used for generation of a relation between states of constituent elements, and
the appending unit uses the rule to generate the relation between the states of the constituent elements to be appended to the system configuration definition.

12. The relation among states appending device according to claim 3,
wherein the inter-state information includes a rule used for generation of a relation between states of constituent elements, and
the appending unit uses the rule to generate the relation between the states of the constituent elements to be appended to the system configuration definition.

13. The relation among states appending device according to claim 4,
wherein the inter-state information includes a rule used for generation of a relation between states of constituent elements, and
the appending unit uses the rule to generate the relation between the states of the constituent elements to be appended to the system configuration definition.

14. The relation among states appending device according to claim 5,
   wherein the inter-state information includes a rule used for generation of a relation between states of constituent elements, and
   the appending unit uses the rule to generate the relation between the states of the constituent elements to be appended to the system configuration definition.

15. The relation among states appending device according to claim 7,
   wherein the inter-state information includes a rule used for generation of a relation between states of constituent elements, and
   the appending unit uses the rule to generate the relation between the states of the constituent elements to be appended to the system configuration definition.

16. The relation among states appending device according to claim 8,
   wherein the inter-state information includes a rule used for generation of a relation between states of constituent elements, and
   the appending unit uses the rule to generate the relation between the states of the constituent elements to be appended to the system configuration definition.

17. A relation among states appending method comprising:
   storing, for each relation among constituent elements of a system, a plurality of instances of inter-state information which indicates relations among states of the constituent elements wherein a follow-up state limitation is included which represents a relation between a state transition of the constituent elements of the system and prescribed states to which the constituent elements transition after the state transition has been executed; and
   appending the relations among the states of the constituent elements to an inputted system configuration definition, using the inter-state information which corresponds to the relations among the constituent elements which are included in the configuration definition.

18. The relation among states appending method according to claim 17, further comprising:
   converting a follow-up state limitation appended to the system configuration definition into a previous state limitation, representing a relation between a prescribed state of the constituent element of the system and a state transition executed after the constituent element transitions to the prescribed state.

19. A non-transitory computer-readable recording medium having recorded therein a relation among states appending program for causing a computer to execute:
   storage processing for storing, for each relation among constituent elements of a system, a plurality of instances of inter-state information which indicates relations among states of the constituent elements wherein a follow-up state limitation is included which represents a relation between a state transition of the constituent elements of the system and prescribed states to which the constituent elements transition after the state transition has been executed; and
   appending processing for appending the relations among the states of the constituent elements to an inputted system configuration definition, using the inter-state information which corresponds to the relations among the constituent elements which are included in the configuration definition.

20. The non-transitory medium according to claim 19, the program further causing the computer to execute:
   conversion processing for converting a follow-up state limitation appended to the system configuration definition into a previous state limitation, representing a relation between a prescribed state of the constituent element of the system and a state transition executed after the constituent element transitions to the prescribed state.

* * * * *